(12) United States Patent
Liscano et al.

(10) Patent No.: US 7,318,109 B2
(45) Date of Patent: Jan. 8, 2008

(54) SYSTEM AND METHOD FOR REMOTE ASSEMBLY OF MESSAGES TO CREATE A CONTROL MESSAGE

(75) Inventors: Ramiro Liscano, Nepean (CA); Sonya Fullarton, Ottawa (CA); Gunter Mussbacher, Ottawa (CA); Tom Gray, Carp (CA)

(73) Assignee: Mitel Networks Corporation (CA)

( * ) Notice: Subject to any disclaimer, the term of this patent is extended or adjusted under 35 U.S.C. 154(b) by 691 days.

(21) Appl. No.: 10/136,144

(22) Filed: May 1, 2002

(65) Prior Publication Data

US 2003/0005032 A1    Jan. 2, 2003

(30) Foreign Application Priority Data

May 2, 2001    (GB) ................. 0110713.5

(51) Int. Cl.
*G06F 13/00*    (2006.01)
(52) U.S. Cl. ...................................... 709/244
(58) Field of Classification Search ................ 709/201, 709/225, 223; 707/10; 370/238; 379/114.15
See application file for complete search history.

(56) References Cited

U.S. PATENT DOCUMENTS

| | | | |
|---|---|---|---|
| 4,984,527 A | | 1/1991 | Falcimaigne |
| 5,675,636 A | * | 10/1997 | Gray .................... 379/114.15 |
| 5,924,103 A | * | 7/1999 | Ahmed et al. ............... 707/201 |
| 5,963,947 A | * | 10/1999 | Ford et al. ..................... 707/10 |
| 5,974,420 A | * | 10/1999 | Lehman et al. ............. 707/101 |
| 6,502,134 B1 | * | 12/2002 | Makarios et al. ........... 709/225 |
| 6,643,650 B1 | * | 11/2003 | Slaughter et al. ............. 707/10 |
| 6,646,990 B1 | * | 11/2003 | Gray et al. ................. 370/238 |
| 6,751,619 B1 | * | 6/2004 | Rowstron et al. ............. 707/10 |
| 7,096,259 B1 | * | 8/2006 | Gray et al. ................. 709/223 |
| 2006/0242256 A1 | * | 10/2006 | Gray et al. ................. 709/213 |

FOREIGN PATENT DOCUMENTS

| | | |
|---|---|---|
| EP | 0835037 | 4/1998 |
| GB | 2353612 | 2/2001 |
| GB | 2355140 | 4/2001 |

* cited by examiner

*Primary Examiner*—Robert B Harrell
(74) *Attorney, Agent, or Firm*—Jones Day

(57) ABSTRACT

A system for remote assembly of messages to create a control message includes a shared coordination space for assembly of messages, and a plurality of components for performing predefined actions and for exchanging messages according to a predetermined ontology. The plurality of components includes a first component for directing other ones of the components to publish information on the coordination space and in response gather several distinct pieces of the information and assemble the distinct pieces as a message by which to control the actions of the component. According to a preferred embodiment, the shared coordination space is a tuple space, one of the components is a call control application for controlling a communication switch, and at least one other component is a directory application containing location information.

11 Claims, 5 Drawing Sheets

SYSTEM AND METHOD FOR REMOTE ASSEMBLY OF MESSAGES TO CREATE A CONTROL MESSAGE

RELATED APPLICATIONS

This application claims priority to U.K. Patent Application No. 0110713.5, filed May 2, 2001 (now abandoned), which is hereby incorporated by reference.

FIELD OF THE INVENTION

The present invention relates in general to the problem of component coordination in distributed systems, and more particularly to a system for remote assembly of messages for maintaining low latency collaboration among components while conserving bandwidth, particularly in wireless systems.

BACKGROUND OF THE INVENTION

Distributed network based systems are now commonly for the provision and creation of useful applications. Components (agent, objects . . . ) are distributed on a network and cooperate together to provide desired services. Several techniques have been proposed to provide for the interaction of these components. These techniques are characterized by unique advantages and disadvantages. This disclosure describes a new system which improves on such prior art techniques. The existing techniques are:
1. Remote method invocation or remote procedure call
2. Remote message passing
3. Remote execution In remote procedure calls or remote method invocation, the components are aware of the detailed operation of each other and can invoke specific behavior in each other. This has the severe disadvantage of requiring that any change in any component be checked for its implications on the expectation of any component that uses its services.

Remote message passing tries to avoid this problem by removing the need for close coupling between the components. With remote method invocations, a change in the detailed operation of one object would require the examination of the operation of all objects which invoke methods on it to ensure that the expectations of these objects have not been violated. This problem may be overcome by confining all interactions to the grammar and semantics of a defined set of messages. Agents or objects can be changed or new objects or agents added as long as they follow the grammar and semantics of the messages. This allows for more openness and evolvability in systems operation.

However the message passing system suffers from the disadvantage of consuming excessive bandwidth in the passing of messages between agents or objects. This can be especially true in the case of wireless applications in which the radio bandwidth is limited and the data rate is low, resulting in high cost to transfer messages and high delay for the applications depending upon them. This has led to the development of the remote execution model of mobile code or mobile agents in which a program, instead of a set of messages, is passed. The program runs at the remote location to fulfill the invoking component's request. This has the advantage in some cases of conserving scarce bandwidth and improving the latency of the applications.

However the remote execution model suffers from serious problems relating to security. Extensive measures must be taken to protect such a system against malicious users who may send damaging objects or agents to it. The measures taken to deal with security concerns in such systems weigh heavily against any benefit from conserved bandwidth. Remote message passing systems are not as severely affected by these security concerns since they do not run independently on the system but are interpreted, which removes the most severe security concerns that affect mobile code.

Voice communications is one area of considerable research and development in the application of distributed systems.

Many call control features provided by communication systems require location information. For example, the initiation of a phone call, the transfer of a call, and the inclusion of a person into a conference call all require user location information. In some cases, it is possible that useful location information is stored in different directory services. According to the prior art, it is impossible for a user to elect to use different directory services during a call session unless the directory services all conform to a standard API and the application allows a selection of different directory applications. Also, since the directory applications have access to all of the user's private directory information through a set of APIs the user is relegated to trusting that the application is only accessing location data and not accessing some other private data.

Thus, it is desirable that directory services be provided whereby location information may be obtained from any directory application within the system with only minimal changes to the directory application while respecting each user's data privacy. It is also desirable to provide a user with the option of invoking a request to communicate from a directory application rather than initiating the request from the call control application. This can be problematic when a user wishes to leverage a corporate directory service using a wireless device and the simplest interface to that information is via a WEB browser. In this circumstance it is impossible to rely on a single application that leverages a set of APIs to such a corporate directory. Thus, there is a need in the industry to provide a system that is capable of leveraging assertion-based call control in order to minimize the coupling between the communication assertion components and the directory application.

This need is made more pronounced by the increasing prevalence of wireless communication devices. In an open environment, services are created for users by the combining of information from multiple sources. In the example above, a user's call request is combined with location information from an external directory to create a message to command an external switch (i.e. PBX). This standard technique is difficult to implement in a wireless environment because of the low bandwidth, error-prone connection provided by wireless devices and the difficulty in providing large amounts of computing power on such devices due to power and size constraints.

SUMMARY OF THE INVENTION

According to the present invention, a method and system are provided for addressing the above-discussed need while overcoming the limitations of the prior art. Generally, the invention provides for assembly of information to create a control message that is implemented outside of the wireless device, thereby avoiding device and connection constraints. The technique of the present invention provides this functionality by allowing a 'remote assembly' of messages in a way that allows the originator to retain control over services that are assembled in creating the full service.

Generally, the system of the present invention allows a component to create an action by sending multiple messages to other components. Rather than replying to the originator over a low capacity and error prone wireless link, these other components place their responses in a common coordination space. According to the preferred embodiment, the coordination space is implemented as a tuple space and the message response is implemented as a tuple space publication action. One or more of the components subscribe to collections of these responses and regard a collection as a message and in response implicitly assemble it.

One example of such an action is the sending of a message indicating that a user wishes to call a specific person who is mobile. This requires that the originator determine where the mobile person is located, by consulting a location service. It is common that the user would also require authorization to contact the mobile person in a specific way (i.e. long distance charges etc.) Thus, the user may be required to contact an authorization service for an authorization token. In a conventional system, the originator assembles a message and forwards it to a service provider. However gathering the necessary information requires several messaging steps using the wireless link. The use of a coordination space as taught by the present invention allows the location and authorization services to place information in the coordination space and for the communication switch that executes the message to obtain the message from the space by a method of implicit assembly. More particularly, the originator sends messages to the communication switch to alert it that the process is about to begin, and to the location and authorization services to require them to post information to the coordination space. The communication switch gathers this information and puts it together with the message information that it receives from the originator to implicitly generate the message.

The 'remote assembly' model according to the present invention enjoys the benefits of both the remote messaging and remote execution models without the disadvantages set forth above. The system of the present invention conserves bandwidth in the same way as the remote execution model but also maintains the security advantages of the remote messaging model. Remote assembly according to the present invention maintains the benefits of loose coupling which are provided by remote messaging and remote execution over the remote method invocation and remote procedure call models.

As discussed above, in the remote assembly model messages are not required to be created at an isolated component (e.g. accessible only over a low speed wireless link). Instead a group of components cooperate together to assemble a message in the coordination space, thereby obviating the need to create messages in an isolated location and send them over a low speed link.

This is especially important in applications where a message has to be assembled from information that is available only from directories in the network. Queries are sent to more than one directory and potentially large objects are retrieved from them. These objects are processed and assembled into a message and sent over the low speed link. According to the prior art, many traversals of the low speed link would be required to do retrieve such potentially large objects. The remote assembly method of the present invention is designed to eliminate the need for these wasteful traversals.

BRIEF DESCRIPTION OF THE DETAILED DRAWINGS

A description of a preferred embodiment of the present invention is provided herein below with reference to the accompanying drawings in which.

DETAILED DESCRIPTION OF THE PREFERRED EMBODIMENT

Figure 1:
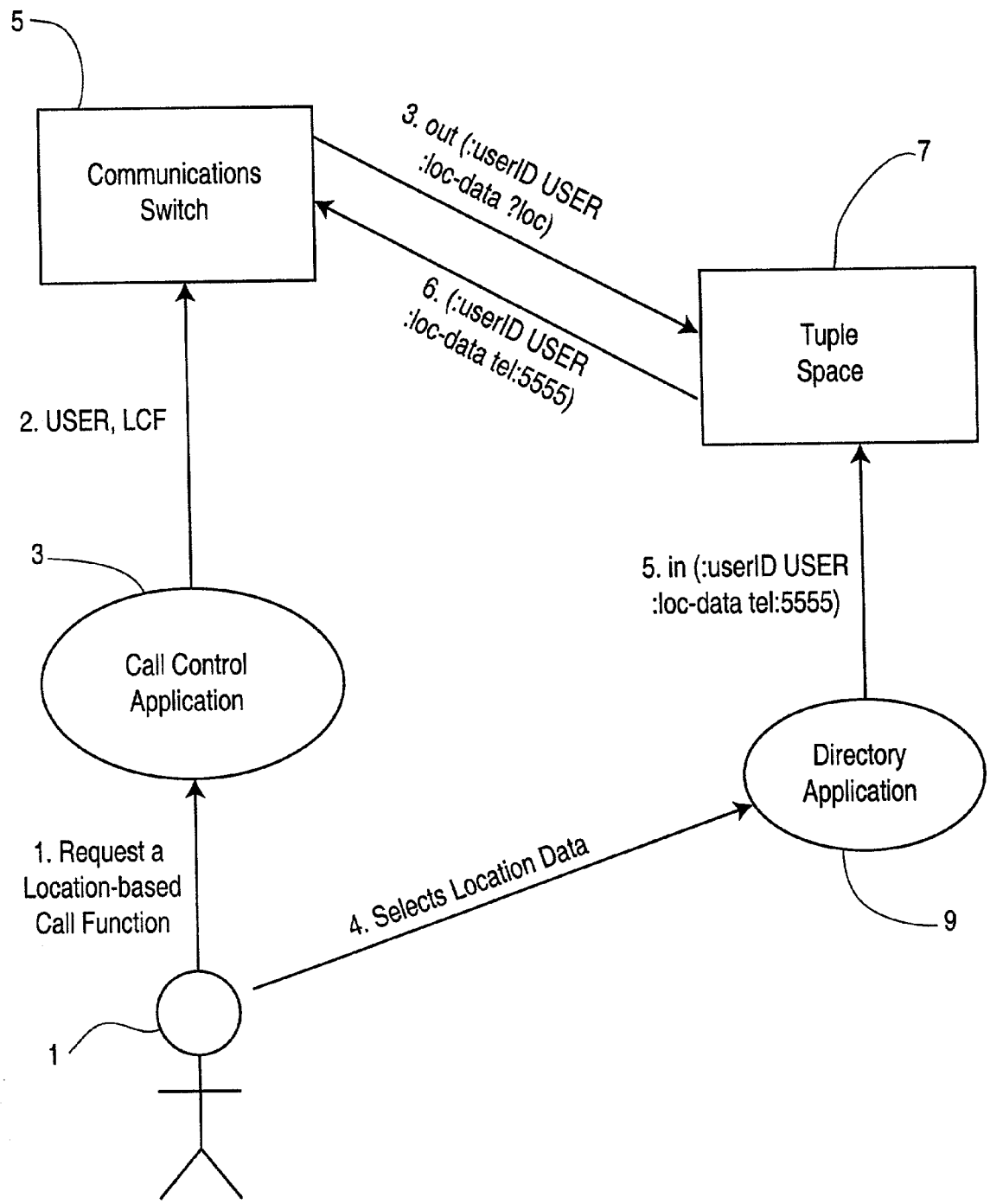
FIG. 1 is a component interaction diagram showing a system for remote assembly of messages in accordance with the present invention.

Before describing the 'remote assembly model' of the invention in detail, a brief description is provided herein below of several different techniques for the creation of applications among multiple components.

A very common technique is to represent each component as an object and for each of the components to provide an API of method calls by which other components can control it. A well-known difficulty of this technique relates to intimately tying the implementations of multiple components together. A change in one component's implementation needs to be analyzed in order to discover how the change impacts the implementations of other components. This has obvious implications on system stability and evolution.

One solution to this problem is a prior art model of message passing in which an agreement is made on a set of standard messages, which can control an application. This decouples implementations since all commonality is now contained within the agreed messages, which can be an open-ended set.

The message passing model has its own difficulties in connection with the resources required for the exchange of messages. This is particularly important in the case of wireless connections in which the links connecting components have low bandwidth and are prone to error. Indeed, the advantages gained by the message passing model in the design of the application may be lost in practice due to the complicated nature of the solutions needed to overcome the limitation of the wireless link and the cost of the physical resources required to implement these solutions.

A previous attempt to solve this problem led to the prior art 'remote execution' model in which messages are built up as scripts or small programs that can be exchanged between components. These scripts execute locally on one component and use the message link only for results or absolutely vital messages. This model solves the aforementioned messaging problem, but at the expense of the privacy and stability of the system due to opening up components to external scripts and programs. To address these problems, the components must be designed to protect themselves from malicious or badly designed external scripts, and an execution environment must be provided for the components. Both of these conditions imply complex resource allocation and limited system evolution.

The 'remote assembly model' provided by the present invention obtains the benefits of messaging and remote execution without the disadvantages set forth above. The system and method of the present invention incorporates Applicant's proprietary system for synchronized distributed processing using tuple spaces as set forth in UK Patent Application No. 9920051.1, Canadian Patent Application No. 2316549 and U.S. patent application Ser. No. 09/642, 340, which is now U.S. Pat. No. 7,096,259, the contents of which are incorporated herein by reference. These prior patent applications describe component coordination of features using a tuple space that ensures that a request in the tuple space solicits a permission first before performing the request. The present invention extends the principles of the prior patent applications to coordination of call control functions and location directory services.

With reference to FIG. 1, when a user 1 wishes to leverage directory dialing according to the present invention, the user selects a feature key or picks up the phone (not shown) which causes call control 3 to issue a command to the communication switch 5 (i.e. PBX). The switch 5 communicates with a shared coordination space 7 to which location information is posted by a directory application 9. After the user selects the person's location from the directory application 9 the call control 3 uses the information in coordination space 7 to complete the call. The foregoing steps are recited in greater detail below following an explanation of the operation of shared coordination space 7. Many call control functions operate using directory services that function in a similar manner as placing a call except that the user activates these options by pressing a selection key on the phone set. Some examples of these call features are call transfer, forward call, conferencing call etc.

The system according to the present invention also allows the user to reverse the interaction steps by first choosing a location from the directory 9 and then requesting the call control feature. The system of the invention operates regardless of the order of the process.

As indicated above, shared storage space 7 is used for the coordination of location-based call control features and directory applications that offer location information to those call control features. This coordination is based on a mechanism in the shared space 7 that allows the call processing application 3 to register for location data and receive any location data asserted by directory application 9. More particularly, messages generated by the applications conform to a common agreement (ontology) or common grammar that allows for exchange via matching of constituent parts within the shared space 7.

As discussed above, one example of this type of shared data coordination system is a tuple space. According to the preferred embodiment of the invention, a tuple space is implemented as the communication mechanism between the call control 3 and directory application 9 (or multiple directory applications).

The tuple space 7 is a shared data storage that uses type-value pairs (tuples) as a representation of information in that shared storage. Type value pairs are defined in the following manner: (:type1 value1 :type2 value2 . . . ). A type can be any alphanumeric name while a value can be a string, number, or another tuple. When the value is another tuple it is prefixed by the special name Tuple as is the following example (:first Tuple (:item1 telephone)).

Assertion-based call control using tuple space 7 requires that the tuple support certain operands. The fundamental operands required for the present invention to function are out, and in operands. The out and in operands can be used to respectively retract a tuple from and assert a tuple to the shared space 7.

Requests from call control 3 are synchronized with location data by defining a particular type that corresponds to location data (e.g. loc-data). Similarly, the data type is defined as a string. In particular, the Uniform Resource Identifier (URI) format is adopted for flexibility and to support different communication protocols being developed for IP telephony. Also since the communication switch 5 generally handles several hundred sessions an identifier is added to the tuples in order to associate the location data to a particular request from call control 3. In order to keep applications independent of each other, a user identifier is adopted rather than a session identifier created by the invocation of the call feature. It is therefore necessary for the user 1 to register with the call control application 3 before requesting a location-based feature and selecting location information from the directory service 9. It is not relevant to the invention how the applications obtain the user identification. Users may use identification cards or be logged into a computer using a particular user name. Alternatively, the information may be stored as a cookie when a WEB interface is used. In the situation where both the call control 3 and directory application 9 reside on the same device a device identifier can be used to replace the user identifier.

In FIG. 1, the telephony switch 5 supports location-based features referred to herein as LCFs (Location Call Features). These location features require a location parameter in order to perform their respective actions. The following set of steps defines the procedure for synchronizing call control requests with location data using assertion-based call control according to the present invention.

Step 1: User 1 requests the use of a location-based feature from the call control application 3.

Step 2: The call control application 3 obtains the caller identification from the OS or prompts the user 1 and sends the request and user ID to the switch 5. The call control application 3 can simply be an interface to the switch 5 (e.g. presented to the user 1 through the phone or a WEB page interface, etc.)

Step 3: The switch 5 registers the request for location data by issuing an out (:userID USER :loc-data ?loc) request to the tuple space 7.

Step 4: The user 1 launches the directory application 9 and selects the location information from the directory.

Step 5: After instructing the directory application 9 to place the data into the tuple space 7, the application augments this information with the user identification. An exemplary tuple is userID USER :loc-data 5555.

Step 6: The request from switch 5 (:userID USER :loc-data ?loc) matches with the incoming data (:userID USER :loc-data 5555) resulting in execution by the switch 5 of the appropriate location-based call feature requested by the user 1.

Figure 2A:
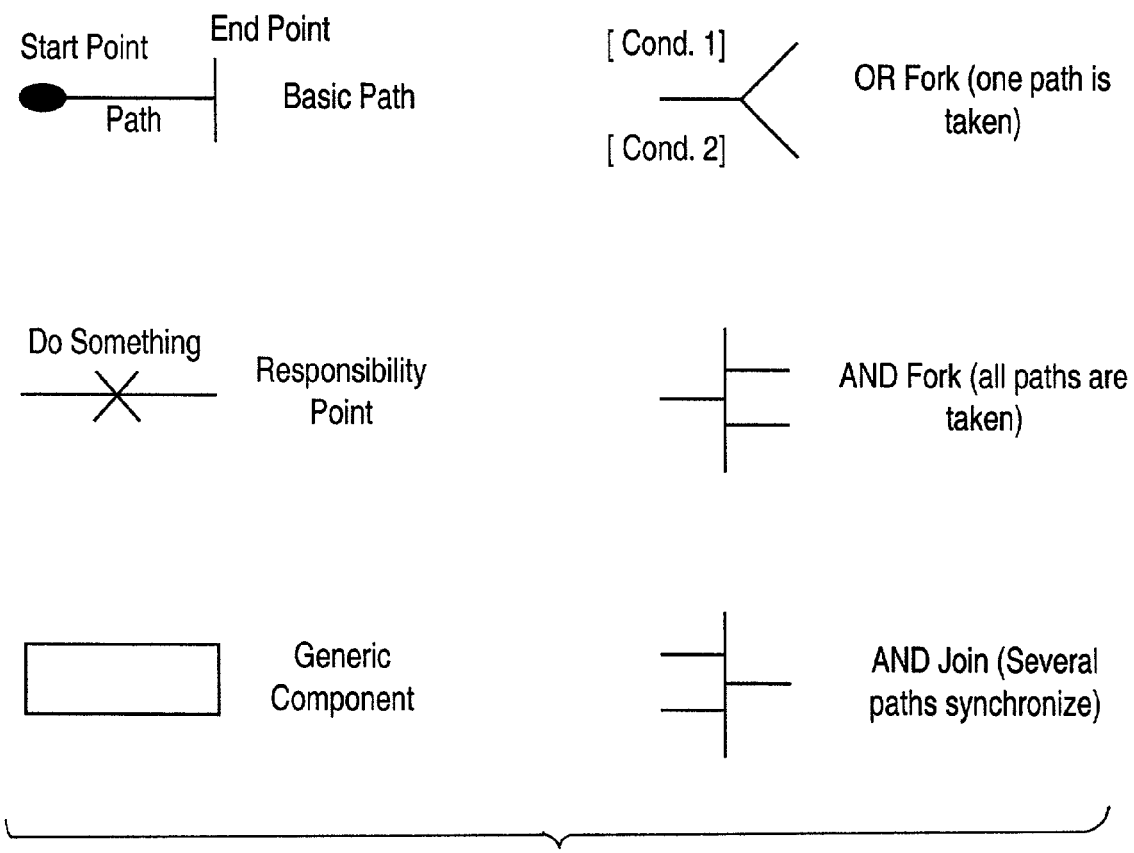
FIG. 2A is legend for the use case map of FIG. 2B showing interaction among the components of FIG. 1.
Figure 2B:
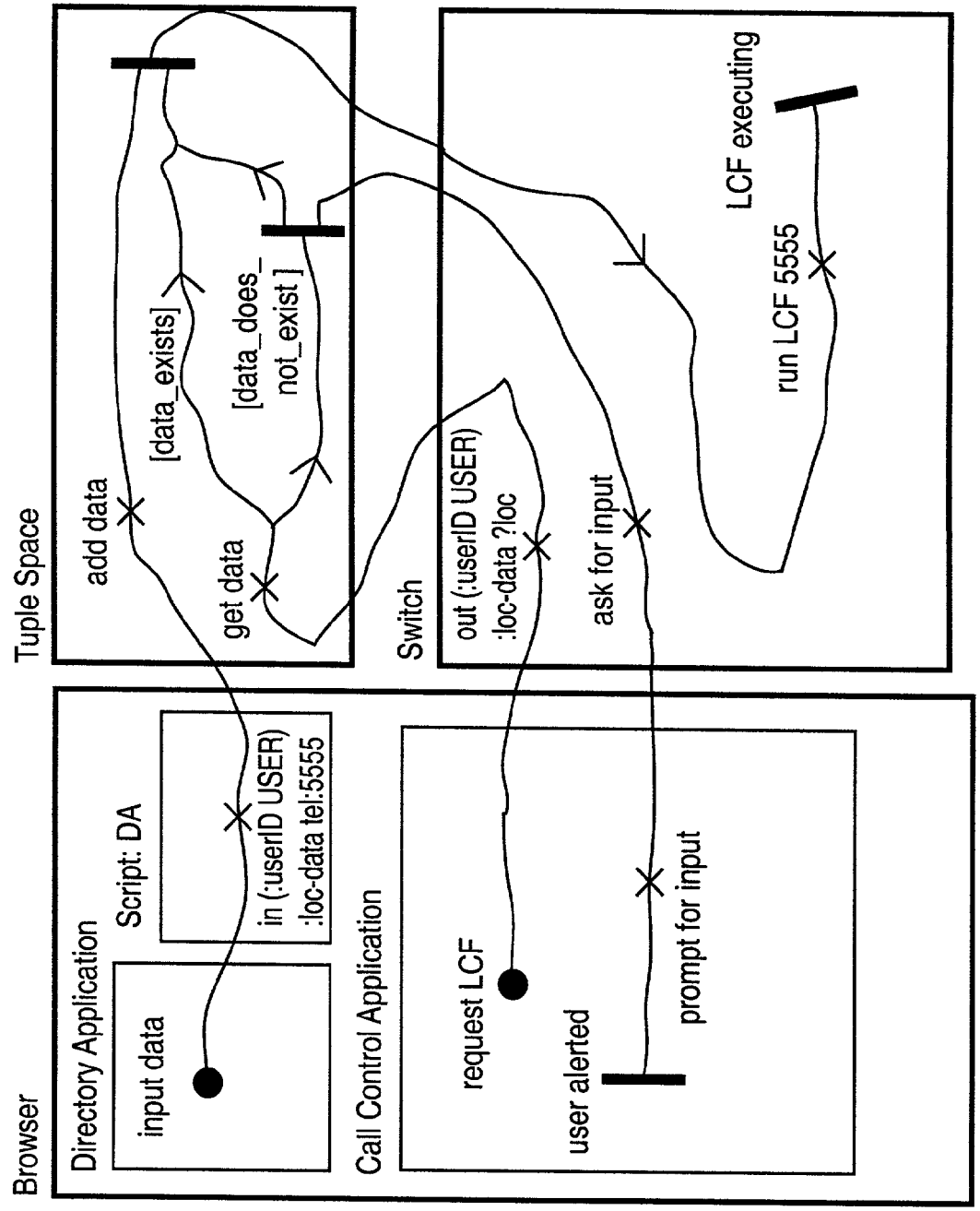

The foregoing interaction among the components in FIG. 1 can also be represented as a Use Case Map as shown in FIG. 2B, where FIG. 2A is a legend explaining the use case map symbols. In this representation, the call control 3 and directory application 9 are shown as applications that execute in a client browser and leverage the use of scripting languages to communicate with the tuple space 7. The use case map is more comprehensive than the component interaction diagram of FIG. 1 in that it can represent all possible user scenarios within the system. For example, there are two possible start points in the Use Case Map (UCM): one from the directory application 9 and the other from the call control application (as indicated in the legend below, start points in UCMs are denoted as black dots). In FIG. 1, the user 1 is shown interacting with the call control application 3 before requesting location data. However, as shown in FIG. 2B it is possible to reverse the procedure and post the location data into the tuple space 7 before issuing the LCF.

The intuitive nature of Use Case Maps (UCMs) permits simple following of the paths defined in the diagrams to trace all possible scenarios. In order to facilitate the understanding of the UCM, the following legend defines the symbols used by the UCM notation of FIG. 2B.

Figure 3:
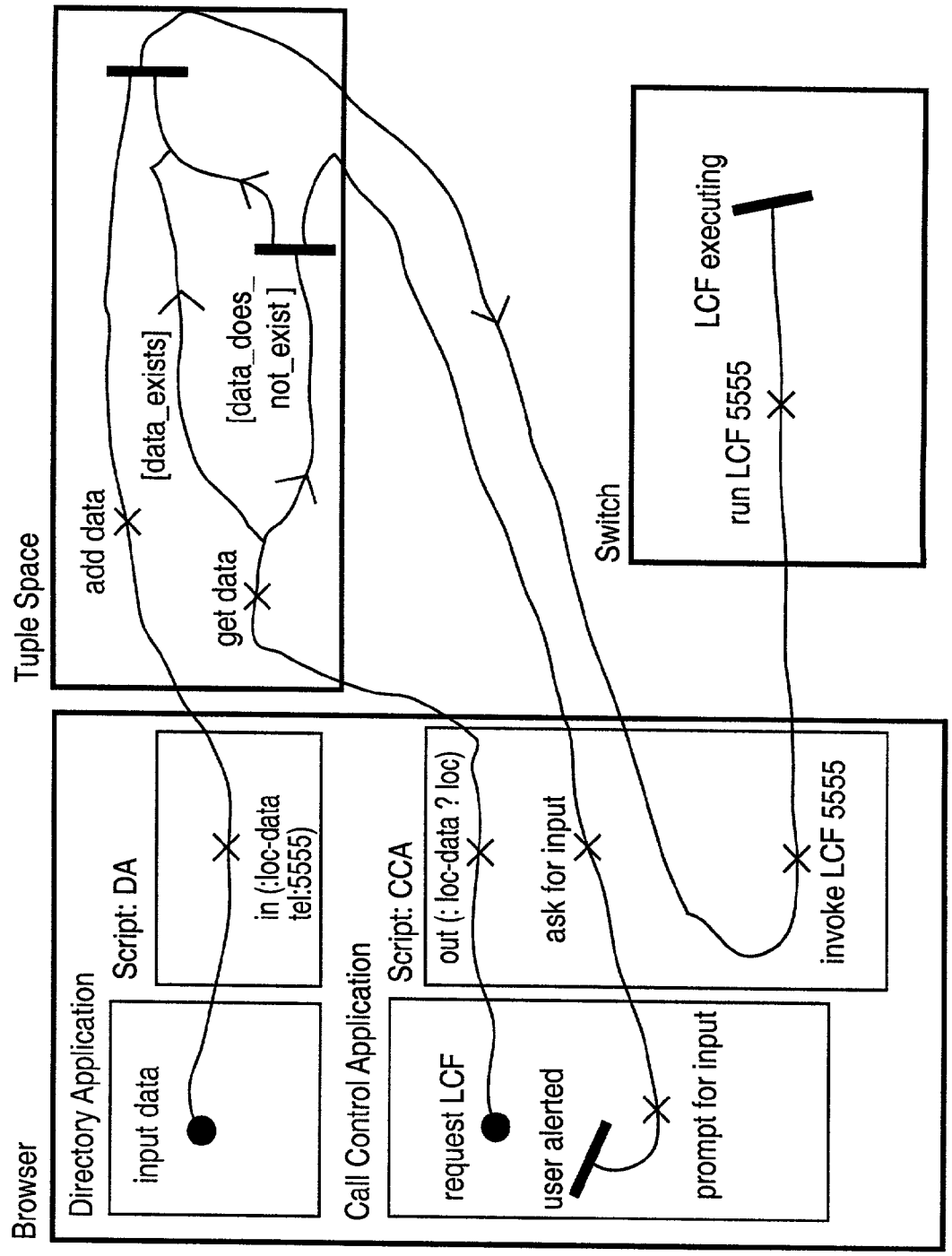
FIG. 3 is a use case map showing interaction among components according to an alternative embodiment.

A first alternative embodiment of the present invention involves movement of the responsibility for communicating with the tuple space 7 from the communication switch 5 to the call control application 3. The preferred embodiment of FIGS. 1 and 2 is best suited for implementation on simple devices that have limited computing capability as well as on wireless devices wherein it is desirable to limit the size of the communication messages on the network. According to the alternative embodiment illustrated in FIGS. 3 and 4, the call control 3 and directory applications 9 reside on the same device and there is no need to require a user identification type.

Figure 4:
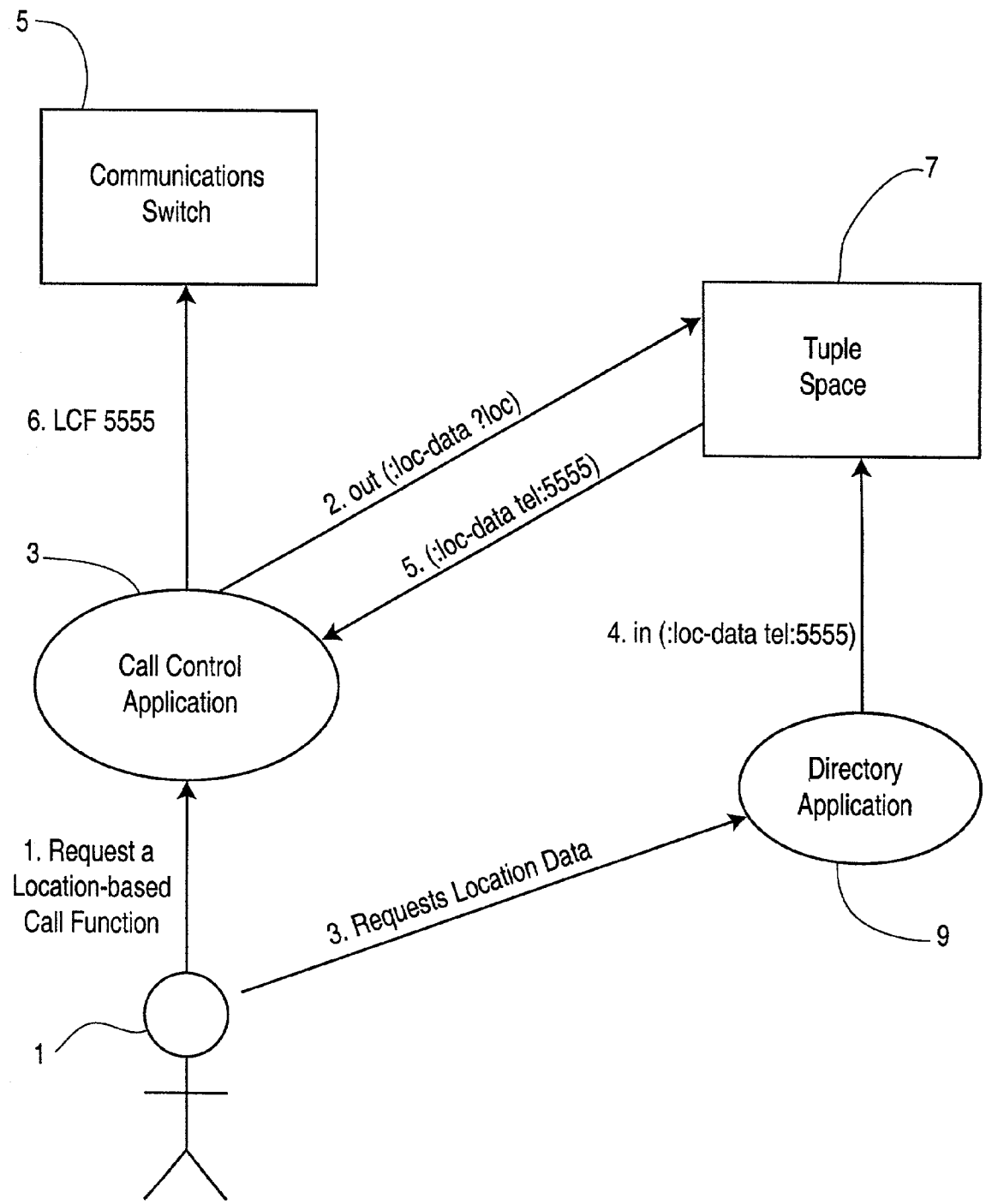
FIG. 4 is a component interaction diagram for the alternative embodiment of FIG. 3.

The following set of steps refers to FIG. 4 and demonstrates the procedure for synchronizing call control requests with location data in the situation where the call control application 3 interacts with the tuple space 7 rather than the communication switch 7.

Step 1: User 1 requests the use of a location-based feature from the call control application 3.

Step 2: The call control application 3 registers the request for location data by issuing an out (:loc-data ?loc) request to the tuple space 7. This may be a blocking or non-blocking operation. In the same operation the call control application 3 notifies the user 1 that it is waiting for location data.

Step 3: The user 1 launches an application that contains location information and is able to communicate with the existing tuple space 7 (e.g. directory application 9 having the ability to communicate with the tuple space 7).

Step 4: After the user 1 selects the location information from the directory 9 and instructs the directory application 9 to place the data into the tuple space 7, the directory application 9 then issues a in (:loc-data 5555) request that has the effect of placing into the tuple space 7 the tuple (:loc-data 5555).

Step 5: The (:loc-data ?loc) request matches with the incoming (:loc-data 5555) data resulting in a response or event being sent to the call control application 3 with the specific tuple that matches the request. At the same time the (:loc-data 5555) tuple is withdrawn from the tuple space 7.

Step 6: The call control application 3 now has sufficient data to proceed with the LCF request to the switch 5.

In summary, a method is provided for facilitating the development of location-based applications that leverage call control 3 without needing to know all of the feature access codes for the different location-based call control features available on the switch 5. This approach also allows one directory application to service a multitude of location-based call control features and conversely several directory applications can be used for a single call control entity 3.

It will be appreciated that, although embodiments of the invention have been described and illustrated in detail, various changes and modifications may be made. This invention can be applied to other communication features that require additional data other than location data. In other words the tuples can be expanded to manage more information than location data. This information includes, for example, user authentication data or account information to complete a transaction. For these types of data, privacy and security are more relevant than for location information and require that the users have greater control over the type of information they are releasing to an application. Other forms of data may include resource identifiers that a particular communications feature can leverage. For example, the volume of a handset may be controlled using several different applications that can place their data type and data into a common tuple space. This would allow for user preferences to be received from applications other than the conventional phone set user interface.

All of the forgoing changes and modifications may be made without departing from the sphere and scope of the invention as defined by the claims appended herein.

What is claimed is:

1. A system for remote assembly of messages to create a control message, comprising:
   a shared data storage for assembly of said messages; and
   a plurality of components for performing predefined actions and for exchanging said messages according to a predefined ontology, said plurality of components including a first component for directing other ones of said components to publish information on said shared data storage and in response gather several distinct pieces of said information and assemble said distinct pieces as said control message by which to control the actions of said first component.

2. The system of claim 1, wherein said shared data storage is a tuple space and said predefined ontology is type-value pairs to represent said information.

3. The system of claim 1, wherein said first component is a wireless device.

4. The system of claim 1, wherein said first component comprises a call control application for controlling a communication switch and at least one of said other ones of said components comprises a directory application for storing location information.

5. The system of claim 4, wherein said call control application communicates directly with said shared data storage for exchanging said messages.

6. The system of claim 4, wherein said call control application communicates with said shared data storage through said communication switch.

7. The system of claim 4, wherein at least a further one of said other ones of said components comprises an authorization service.

8. The system of claim 4, wherein access to said location information in said directory application is via a WEB interface from a corporate directory that does not provide an API to its data.

9. The system of claim 4, wherein said call control application and said directory application execute within a WEB browser and utilize scripting language to communicate with said shared data storage.

10. A method of synchronizing a call control request to a communication switch with location data from a directory application using a tuple space, comprising:
    user initiation of a request for use of a location-based feature from a call control application;
    receiving caller identification at said call control application and in response sending said request for use of a location-based feature and caller identification to said communication switch;
    registering said request for use of a location-based feature at said communication switch by publishing an anti-tuple to said tuple space that includes said caller identification;
    user selection of said location data from said directory application;

publishing a tuple to said tuple space that includes said location data from said directory application and said caller identification; and matching said tuple with said anti-tuple within said tuple space; and assembling a control message based on said caller identification and said location data, causing said communication switch to execute the location-based feature requested by the user.

11. A method of synchronizing a call control request to a communication switch with location data from a directory application using a tuple space, comprising:

user initiation of a request for use of a location-based feature from a call control application;

registering said request for use of a location-based feature by publishing an anti-tuple to said tuple space;

user selection of said location data from said directory application;

publishing a tuple to said tuple space that includes said location data from said directory application; and matching said tuple with said anti-tuple within said tuple space; and assembling a control message based on said request and said location data, causing said communication switch to execute the location-based feature requested by the user.

* * * * *